(12) United States Patent
Suzuki

(10) Patent No.: US 10,883,400 B2
(45) Date of Patent: Jan. 5, 2021

(54) HONEYCOMB STRUCTURE AND CATALYST BODY

(71) Applicant: DENSO CORPORATION, Kariya (JP)

(72) Inventor: Kouhei Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 16/071,498

(22) PCT Filed: Jan. 18, 2016

(86) PCT No.: PCT/JP2016/080846
§ 371 (c)(1),
(2) Date: Jul. 20, 2018

(87) PCT Pub. No.: WO2017/126174
PCT Pub. Date: Jul. 27, 2017

(65) Prior Publication Data
US 2019/0024551 A1    Jan. 24, 2019

(30) Foreign Application Priority Data

Jan. 21, 2016   (JP) ................. 2016-009838

(51) Int. Cl.
| F01N 3/022 | (2006.01) |
| F01N 3/28 | (2006.01) |
| B01D 53/94 | (2006.01) |
| B01J 35/04 | (2006.01) |
| F01N 3/20 | (2006.01) |

(52) U.S. Cl.
CPC ........... *F01N 3/0222* (2013.01); *B01D 53/94* (2013.01); *B01D 53/945* (2013.01); *B01D 53/9495* (2013.01); *B01J 35/04* (2013.01); *F01N 3/208* (2013.01); *F01N 3/28* (2013.01); *F01N 3/2828* (2013.01); *F01N 2330/06* (2013.01)

(58) Field of Classification Search
None
See application file for complete search history.

(56) References Cited

U.S. PATENT DOCUMENTS

| 4,740,408 A | * | 4/1988 | Mochida | ............... | B01D 46/10 422/179 |
| 2002/0045541 A1 | | 4/2002 | Koike et al. | | |

FOREIGN PATENT DOCUMENTS

| JP | 2005-262098 | 9/2005 |
| JP | 2008-115717 | 5/2008 |
| WO | 01/28665 A1 | 4/2001 |

* cited by examiner

*Primary Examiner* — David Sample
*Assistant Examiner* — Elizabeth Collister
(74) *Attorney, Agent, or Firm* — Nixon & Vanderhye PC

(57) ABSTRACT

A honeycomb structure provided with cell walls which partition the inside of a cylindrical outer skin having openings at both ends, and a large number of cells which are surrounded by the cell walls and provided in parallel in an axial direction of the cylindrical outer skin. At least part of the large number of cells include a protruding piece. The protruding piece forms a through-hole which penetrates the cell wall, and a protruding wall which protrudes inward of the cell at an angle from an edge of the through-hole.

20 Claims, 12 Drawing Sheets

HONEYCOMB STRUCTURE AND CATALYST BODY

CROSS REFERENCE TO RELATED APPLICATIONS

This application is the U.S. national phase of International Application No. PCT/JP2016/080846 filed Oct. 18, 2016, which designated the U.S. and claims priority to JP Patent Application No. 2016-009838 filed Jan. 21, 2016, the entire contents of each of which are hereby incorporated herein by reference.

TECHNICAL FIELD

The present disclosure relates to a honeycomb structure and a catalyst body which are used in an exhaust purification catalyst or the like.

BACKGROUND ART

An exhaust purification catalyst attached to an exhaust pipe of an automobile or the like includes a honeycomb structure having a large number of cells parallel to the flow of exhaust, and catalyst layers formed on surfaces of cell walls which provides partition for the large number of cells. The exhaust flowing from one end of the honeycomb structure is purified by contacting the catalyst layers on the cell walls while passing through the large number of cells.

In order to improve the purification performance of the exhaust purification catalyst, a structure for increasing the area of contact between the exhaust and the catalyst layers is being considered. For example, Patent Literature (PTL) 1 discloses a catalyst with an improved cell wall surface area by forming the cell walls in the honeycomb structure so to provide irregular surfaces. As another configuration example, protrusions are formed to block a passage of the exhaust gas, or cell walls are curved so that the exhaust gas collides with the cell walls. Furthermore, it is known that the flow of exhaust flowing into the cells in the honeycomb structure develops a boundary layer near the cell walls as the exhaust proceeds downstream, and thus there is yet another example in which turbulent flow is generated, for example, by holes, irregularities, formed in the cell walls.

CITATION LIST

Patent Literature

[PTL 1] JP 2002-177793 A

SUMMARY OF THE INVENTION

In the honeycomb structure, when the protrusions are formed on the cell walls, the cross-sectional area of the cells through which the exhaust passes is reduced, and thus an increase in pressure loss is inevitable. Furthermore, a part of the catalyst layers on the cell walls is often not usable because the gas flow is stagnant or separated in the flow behind the protrusions. When the holes are formed in the cell walls, the strength of the cell wall decreases and the area of contact is reduced, and moreover, unless the exhaust is sufficiently circulated through the holes, the effect of improving the purification performance is not obtained. For example, when the protrusions and the holes are combined, the pressure loss of a cell having a protrusion increases more than that of another cell without a protrusion, this in turn impedes the flow of exhaust. As a result, the exhaust flow is tends to be higher in cells having no protrusion. Therefore, there is the problem that when the exhaust flow rate of the cell having the protrusion decreases, the catalyst layer is not effectively used and the effect to be obtained as a result of forming the protrusion is not obtained.

Objects of the present disclosure are to provide a honeycomb structure in which a gas is concentrated to parts of a large number of cells, and an area of a cell wall that contacts the gas flow can be increased while suppressing an increase in pressure loss and decrease in strength of the cell wall. Furthermore, the present disclosure also aims to provide a catalyst body which can improve the purification performance by increasing the contact rate with a catalyst using such a honeycomb structure.

An aspect of the present disclosure is a honeycomb structure including cell walls which partition an inside of a cylindrical outer skin having openings at both ends, and a large number of cells which are surrounded by the cell walls, provided in parallel in an axial direction of the cylindrical outer skin, and have a polygonal cross section shape. At least part of the large number of cells include protruding pieces surrounding a vertex of the polygonal shaped cell. Each of the protrusion pieces forms a through-hole which penetrates through a corresponding one of the cell walls and a protruding wall which protrudes inward of a corresponding one of the cells at an inclination from an edge of the through-hole.

Another aspect of the present disclosure is a catalyst body loaded onto a honeycomb structure. The honeycomb structure includes cell walls which partition an inside of a cylindrical outer skin having openings at both ends, and a large number of cells which are surrounded by the cell walls and provided in parallel in an axial direction of the cylindrical outer skin, and have a polygonal cross sections shape. A catalyst body is provided with at least a part of the large number of cells include protruding pieces surrounding a vertex of the polygonal shaped cell. Each of the protrusion pieces forms a through-hole which penetrates through a corresponding one of the cell walls, and a protruding wall which protrudes inward of a corresponding one of the cells at an inclination from an edge of the through-hole.

Advantageous Effects of the Invention

In the honeycomb structure according to the abovementioned aspect, since the protruding pieces are provided on at least some of the large number of cells, air can pass between adjacent cells through the through-hole open in the cell wall, and moreover the oblique protruding wall leading to the through-hole promotes the gas flow into an adjacent cell reducing the difference in pressure. Furthermore, the protruding piece does not reduce the surface area of the cell wall, meaning that the decrease in strength is suppressed. Moreover, since the protruding wall disturbs the gas flow near the cell wall, development of a boundary layer is reduced, which allows the gas flow and the cell wall to easily contact each other.

Thus, when the honeycomb structure is applied to the exhaust purification catalyst, exhaust is allowed to flow across the large number of cells so that the ratio of contact between the exhaust and the catalyst layer formed on a surface of the cell wall can increase, and thus the exhaust purification performance can be improved.

BRIEF DESCRIPTION OF THE DRAWINGS

These and other objects, advantages and features of the present disclosure will become more apparent from the following detailed description taken in conjunction with the accompanying drawings, in which.

DESCRIPTION OF THE EMBODIMENTS

First Embodiment

Figure 1:
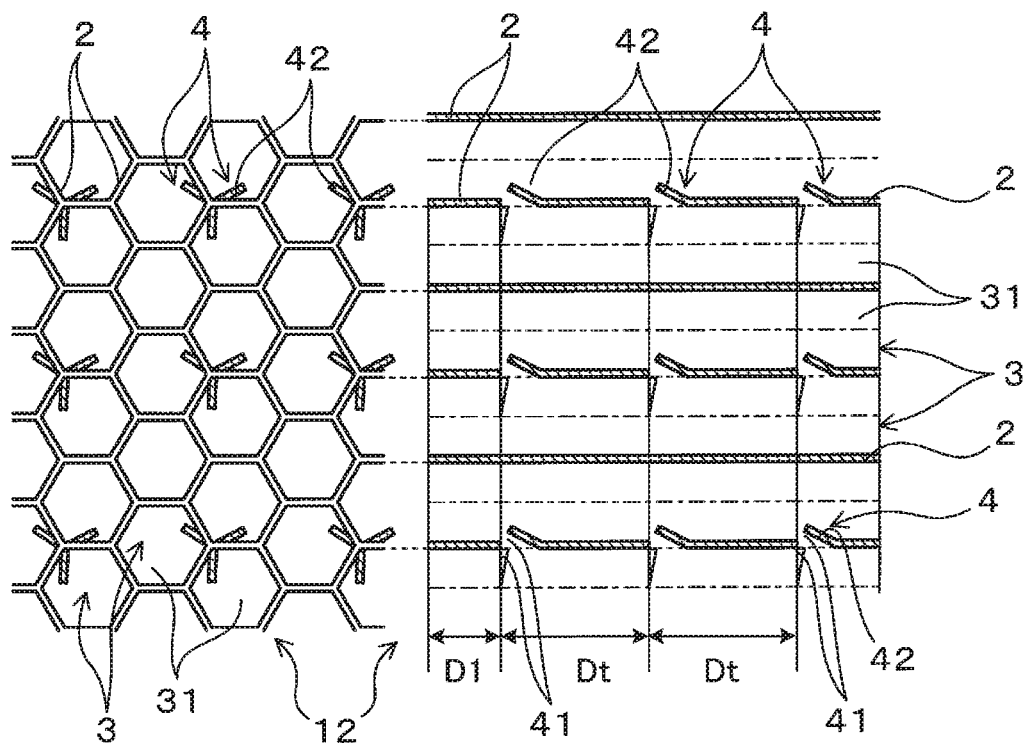
FIG. 1 is an enlarged view of a main part of an end surface of a honeycomb structure and an axial cross-sectional view thereof according to a first embodiment.
Figure 2:
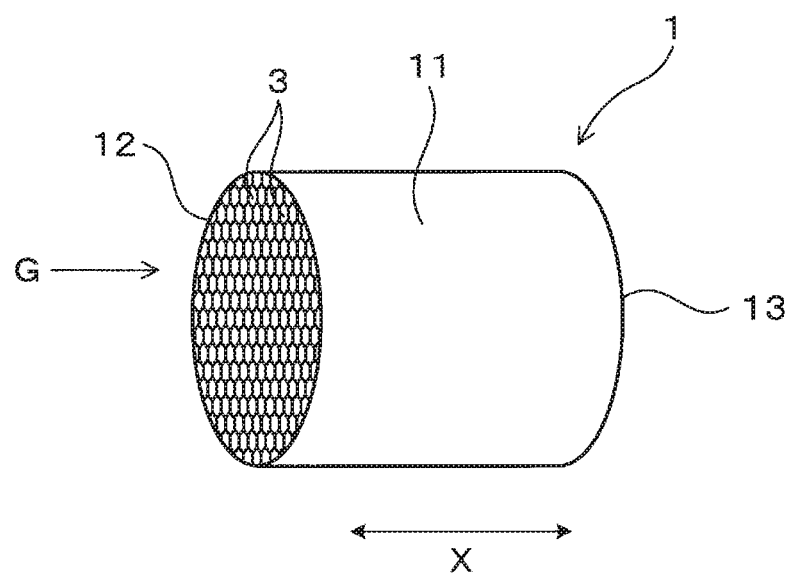
FIG. 2 is an overall perspective view showing an overall structure of the honeycomb structure according to the first embodiment.

A first embodiment of a honeycomb structure will be described with reference to the drawings. As shown in FIGS. 1 and 2, a honeycomb structure 1 includes a cylindrical outer skin 11 having openings at both ends, cell walls 2 which partition the inside of the cylindrical outer skin 11, and a large number of cells 3 surrounded by the cell walls 2. The large number of cells 3 are provided parallel in an axial direction X of the cylindrical outer skin 11, and are open at both end surfaces of the cylindrical outer skin 11. The honeycomb structure 1 is used, for example, as a catalyst carrier to load a catalyst, and forms a catalyst body provided with catalyst layers (not shown in the drawings) on surfaces of the cell walls 2 disposed to face the large number of cells 3. Such a catalyst body is applied, for example, to an exhaust purification catalyst for automobile engines and is coaxially attached to the inside of an exhaust gas pipe to purify exhaust G from an engine.

As shown in FIG. 1, the honeycomb structure 1 includes, in at least a part of the large number of cells 3, a protruding piece 4 on the cell walls 2 surrounding the cell 3. The protruding piece 4 is a rising cut piece provided on the cell wall 2 which forms a through-hole 41 and a protruding wall 42 which protrudes obliquely inwardly from an edge of the through-hole 41 to an inside of the cell 3. The through-hole 41 penetrates through the cell wall 2. A rising open edge of the protruding piece 4 forms the edge of through-hole 41 and forms the protruding wall 42 integrally rising from a part of the through-hole 41. Each of the large number of cells 3 is, for example, a polygonal cell. In the present embodiment, a hexagonal cell having a hexagonal cross-section is used, and each cell 3 is adjacent to six of the cells 3 via the cell walls 2 forming six sides of a hexagon.

The large number of cells 3 in the honeycomb structure 1 include a large number of gas passages 31 which are formed to extend from an end surface 12 (for example, the left end surface in FIG. 2) located at an upstream-side of an exhaust G flow, to an end surface 13 (for example, the right end surface in FIG. 2) located at a downstream-side in the flow of exhaust gas G. The protruding wall 42 formed of the protruding piece 4 obliquely rises with respect to the cell wall 2 so that a leading end of the protruding wall 42 is directed upstream in the flow of exhaust gas G. At this time, the exhaust gas G flowing into the cell 3 which has the protruding piece 4 can flow into a gas passage 31 inside the adjacent cell 3 and through the through-hole 41 which is open at the proximal end of the protruding piece 4.

In the honeycomb structure 1 according to the present embodiment, the protruding piece 4 is provided in a plurality of the cells 3, among the large number of cells 3, and a plurality of protruding pieces 4 are provided inside each cell 3, at an interval in an axial direction. Since the protruding piece 4 is formed of a rising cut piece of the cell wall 2, the through-hole 41 can be formed without reducing an effective area of the cell wall 2 which serves as a catalyst carrier. Furthermore, the protruding wall 42 formed of the protruding piece 4 is oblique with respect to the flow of exhaust gas G and thus is less likely to have dead space where the exhaust gas G will not contact the protruding wall 42, allowing effective use of both surfaces thereof so that the ratio of contact with the exhaust gas can increase.

The honeycomb structure 1 includes a predetermined density of such protruding pieces 4. Specifically, the protruding pieces 4 are arranged such that the density of the protruding pieces 4 per unit area is at least 1 piece/cm$^2$, in a projection plane on which the protruding pieces 4 in the cells 3 are projected on the end surface 12, on which the large number of cells 3 are open. Thus, when the catalyst layer is formed, the exhaust purification performance of the catalyst body can be improved. Preferably, when the protruding pieces 4 are arranged such that the density of the protruding pieces 4 per unit area is 2 pieces/cm$^2$ to 40 pieces/cm$^2$, the exhaust purification performance can be improved while suppressing an increase in pressure loss and decrease in strength.

In an arrangement example shown in the left view in FIG. 1, a plurality of cells 3 each having one protruding piece 4 are provided on the cell wall 2 which forms one side of a hexagon. These cells 3 are arranged adjacent to each other and are distributed over the entire honeycomb structure 1. Specifically, the cells 3 each having the protruding piece 4 on one side are arranged to surround the cell 3 which has no protruding pieces 4. The protruding pieces 4 are evenly arranged in the same or similar pattern over the entire honeycomb structure 1. In this pattern, the cells 3 each having the protruding piece 4 are arranged such that sides having the protruding pieces 4 are adjacent to each other in a manner such that three protruding pieces 4 are symmetrically disposed with respect to the vertex shared by three adjacent cells 3.

At this time, three cells 3 of a shared center vertex are disposed to form a symmetrical shape, and the gas passages 31 inside the three cells 3 have substantially the same cross-sectional areas. Furthermore, as shown in the right view in FIG. 1, in an axial cross-section passing through the shared vertex, the cells 3 each having the protruding piece 4 in a predetermined position are continuously and regularly arranged in a direction orthogonal to an axial direction X, and two adjacent cells 3 communicate through the through-hole 41. A plurality of the protruding pieces 4 are provided inside each cell 3 at a predetermined distance Dt in the axial direction. The protruding piece 4 located farthest upstream is positioned at a distance D1 (for example, Dt≥D1) away from the end surface 12 located upstream.

Figure 3:
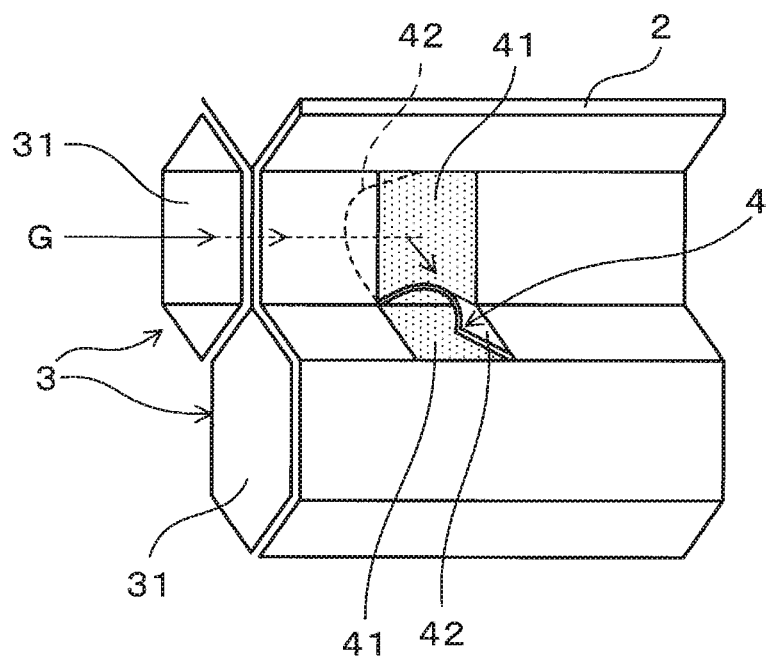
FIG. 3 is an enlarged perspective view of a main part of the honeycomb structure showing an outline structure of a cell provided with a protruding piece according to the first embodiment.

As shown in FIG. 3, the three cells 3 which share a vertex each have the protruding piece 4 provided to surround the shared vertex of the three adjacent cells. Each of the protruding pieces 4 are formed by cutting and raising the cell walls 2 in substantially the same positions in the axial direction. Each protruding piece 4 forms the protruding wall 42 which protrudes into each cell 3, from the position of the proximal end integrated with the cell wall 2. An opening which is formed on the cell wall 2 by cutting and raising becomes the through-hole 41. Here, the protruding wall 42 has a curved shape projecting into the cell and a side of the projecting curve which decreases in height along the position of the proximal end close to the vertex of the hexagon. The protruding wall also has an oblique shaped part which decreases in height towards a base end position extending to the inside of the cell from the vertex, which is disposed to cover the through-hole 41. Note that although FIG. 3 shows the protruding pieces 4 formed on two of the three cell walls 2, the protruding piece 4 formed on the remaining one has the same or similar shape.

In this manner, three adjacent cells 3 communicate with one another through the through-holes 41 which are located in substantially the same positions with respect to the shared vertex. Since the protruding walls 42 which have the same shape are symmetrically arranged in the gas passages 31 inside the cells 3, differences in pressure and gas flow rate between three gas passages 31 will not occur. Thus, the exhaust G can flow between adjacent gas passages 31, and the exhaust gas G can easily contact the inner surface of the protruding wall 42 by flowing into the through-hole 41 along the oblique protruding wall 42. Furthermore, the exhaust G that passes through the through-hole 41 collides with the protruding wall 42, which protrudes into an adjacent gas passage 31, and flows downstream along the oblique outer surface of the protruding wall 42. An occurrence of the exhaust gas flow being separated from the protruding wall 42, a stagnant flow, or the like is thus eliminated, resulting in an increase in the ratio of contact with the protruding wall 42.

Figure 4:
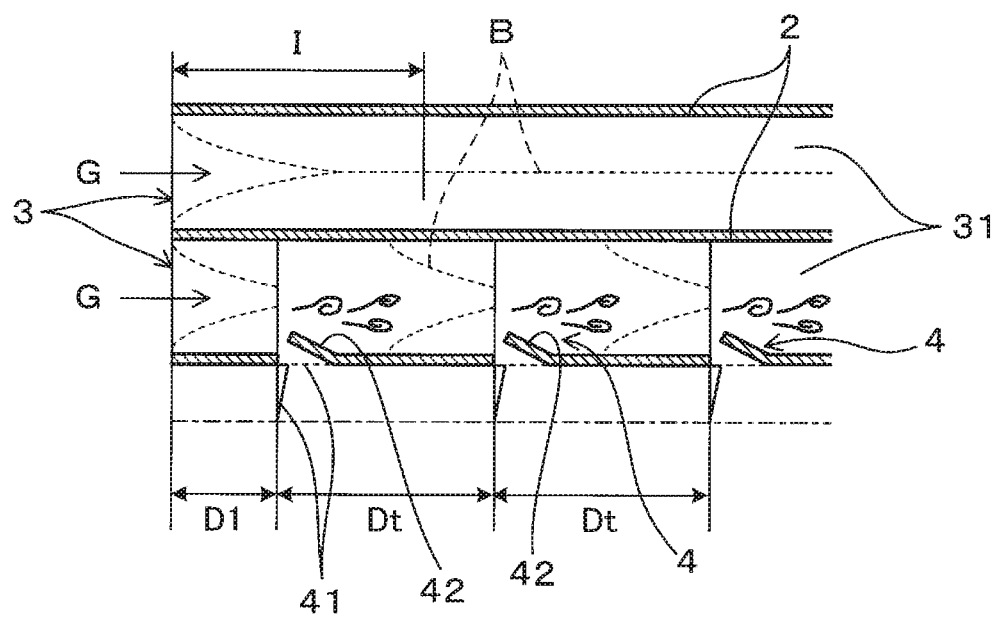
FIG. 4 is an enlarged cross-sectional view of a main part of the honeycomb structure comparatively showing a flow of an exhaust gas in a cell provided with the protruding piece in and a cell which is not provided with a protruding pieces according to the first embodiment.

Furthermore, as shown in FIG. 4, a boundary layer B is formed on a surface of the cell wall 2 by the effect of viscosity of the exhaust gas G that has flowed into the cells 3 having protruding pieces 4. As the heat transfer coefficient and the mass transfer coefficient are reduced inside the boundary layer B, a ratio of heat which is received from the exhaust gas is reduced, and moreover a ratio of contact with the surface of the cell wall 2 is also reduced. This boundary layer B develops further downstream and becomes thickest in the central area. A distance to a point in which the maximum thickness is reached is referred to as an entrance segment I, and the purification performance decreases for the exhaust gas that passes a downstream area of the entrance segment I.

In contrast, in the cell 3 having the protruding piece 4, turbulent flow is formed around the protruding wall 42 in the gas passage 31 inside the cell 3, and the boundary layer B is destroyed. Thus, when the distances D1 and Dt at which the protruding pieces 4 are arranged are set shorter than the entrance segment I (that is, I≥Dt≥D1), development of the boundary layer B can be suppressed. In the area downstream of the protruding wall 42, the boundary layer B is formed again, but the boundary layer B is limited to being thin, and thus the heat transfer coefficient and the mass transfer coefficient can be maintained.

Figure 5:
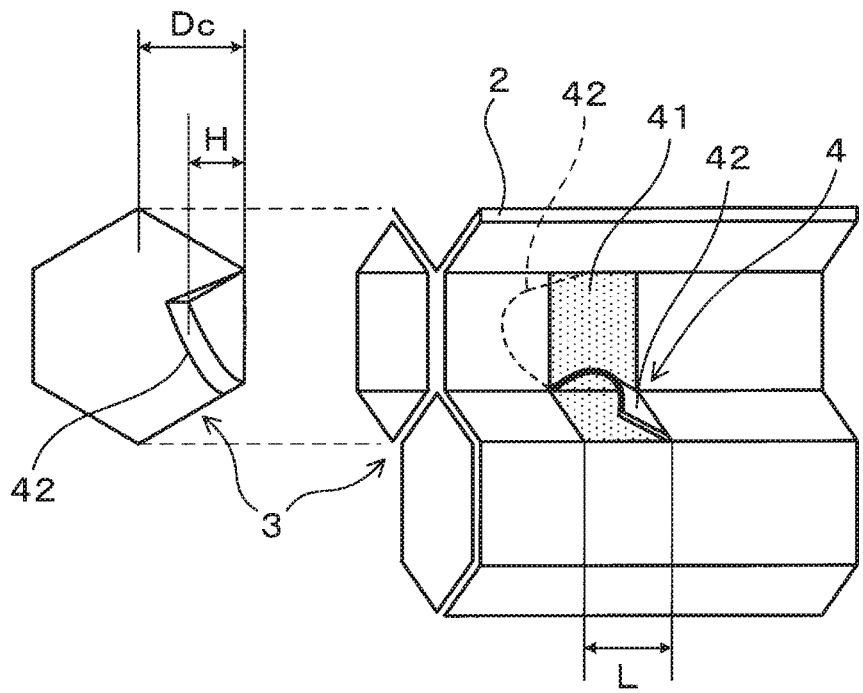
FIG. 5 is an enlarged view of a main part of the cell in the honeycomb structure showing a relationship between a height and a length of the protruding piece according to the first embodiment.

In the radial cross-section of the cell 3 shown in FIG. 5, the height H of the protruding piece 4 is a distance between a leading end position and a proximal end position of the protruding wall 42, in a radial direction. The height H of the protruding piece 4 can be arbitrarily set and may be preferably 5 μm or more, for example. It is desirable that the height H is set according to the thickness tc of the catalyst layer that is formed on the surface of the cell wall 2. The thickness tc of the catalyst layer in a typical exhaust purification catalyst is usually in the range of 5 to 200 μm and preferably in the range of 20 to 100 μm, which has tendency to decrease in thickness. When the height H of the protruding piece 4 is set to be greater than or equal to the thickness tc of the catalyst layer (that is, H≥tc), the protruding wall is not buried in the catalyst layer, and thus the purification performance can be improved.

Furthermore, as the height H increases, the leading end of the protruding wall 42 becomes closer to a center of the cell 3, and thus pressure loss increases. Therefore, the height H of the protruding piece 4 is preferably less than or equal to a distance Dc to the center of the cell 3. Note that the distance Dc to the center of the cell 3 is represented by Dc=(P−t)/2, where P is a cell pitch and t is the thickness of the cell wall 2. Preferably, when the configuration is set to satisfy Dc≥H≥Dc/2, the effect of improving the purification performance of the protruding wall 42 can be obtained while suppressing an increase in pressure loss.

In the axial cross-section of the cell 3 shown in FIG. 5, the length L of the protruding piece 4 is the length of the protruding wall 42 from the proximal end position to the leading end position thereof which corresponds to the axial length of the through-hole 41 open in the cell wall 2. Preferably, the length L of the protruding piece 4 is appropriately set, according to the height H, the distance Dt in the axial direction of the protruding piece 4, the cell pitch P, and the like. For example, when the height H of the protruding piece 4 increases relative to the length L thereof, the pressure loss tends to increase, thus, the length L of the protruding piece 4 is preferably greater than or equal to the height H thereof (that is, L≥H). Furthermore, when the length L of the protruding piece 4 increases, the strength tends to decrease, thus, the length L is preferably set to be less than the distance Dt, the cell pitch P, or the like (that is, Dt≥L and P≥L). Preferably, the length L of the protruding piece 4 is less than or equal to the distance Dt/2 (that is, Dt/2≥L).

Note that the height H, the length L, and the distance Dt of each of the protruding pieces 4 formed in the same cell 3 or more than one cell 3 may be different and is not necessarily constant. Furthermore, the arrangement of the cells 3 having the protruding pieces 4 is not limited to the abovementioned pattern and can be arbitrarily set. An example of different arrangement of the protruding pieces 4 will be shown below. Note that in a second embodiment and the subsequent embodiments, the same reference signs as those in the first embodiment denote the same elements.

Second Embodiment

Figure 6:
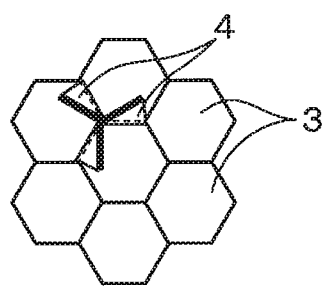
FIG. 6 schematically shows an example of arrangement of the cells provided with protruding pieces of the honeycomb structure according to a second embodiment.

Although the protruding pieces 4 are symmetrically arranged in each of three adjacent cells 3 and positioned so as to surround the cell 3 provided with no protruding pieces 4 as shown in FIG. 1 in the first embodiment, the arrangement of the cells 3 having the protruding pieces 4, the number of protruding pieces 4, etc., can be changed as appropriate such that the protruding pieces 4 are included at a desired density. For example, in the example shown in FIG. 6, when six cells are arranged around the cell 3 having the protruding piece 4, the protruding pieces 4 are provided in only two of the cells 3 that share a vertex with one side of a center cell 3 on which the protruding piece 4 is provided.

Figure 7:
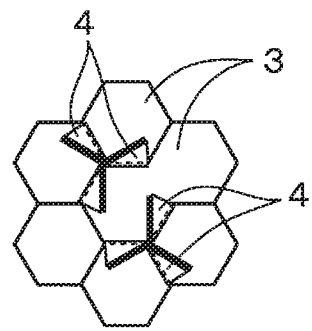
FIG. 7 schematically shows an example of an arrangement of the cells provided with protruding pieces of the honeycomb structure according to the second embodiment.
Figure 8:
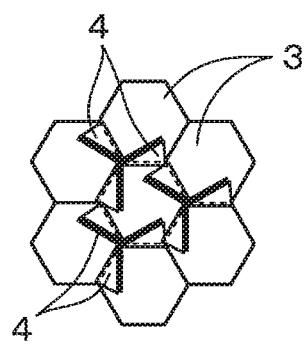
FIG. 8 schematically shows an example of an arrangement of the cells provided with protruding pieces in the honeycomb structure according to the second embodiment.

As shown in FIG. 7, the protruding piece 4 may be provided on each of two opposite sides of the center cell 3, and the protruding piece 4 may be provided on two cells 3 that share a vertex with each of these two opposite sides. As shown in FIG. 8, the protruding piece 4 may be provided on each of three non-adjacent sides of the center cell 3, and the protruding piece 4 may also be provided in two of the cells 3 that share a vertex with each of these three non-adjacent sides. In the example shown in FIG. 8, one protruding piece 4 is formed on each of the cells 3 surrounding the center cell 3.

Figure 9:
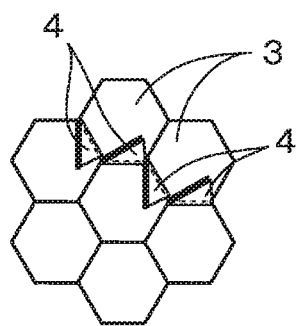
FIG. 9 schematically an example of an arrangement of the cells provided with protruding pieces of the honeycomb structure according to the second embodiment.

As shown in FIG. 9, the protruding piece 4 may be provided on one side of the center cell 3, and the protruding piece 4 may be provided on each of the three cells 3 that share three continuous sides including said one side. Also at this time, similar effects can be obtained because the protruding pieces 4 having equivalent shapes are arranged around the shared vertex. Furthermore, the protruding pieces 4 are not concentrated to be on the center cell 3, and therefore an increase in pressure loss can be easily suppressed.

Third Embodiment

Figure 10:
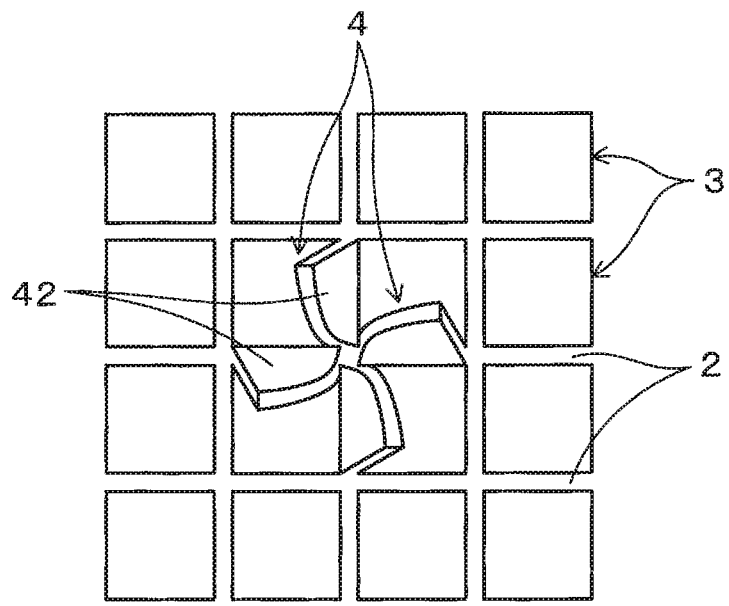
FIG. 10 schematically shows an example of an arrangement of the cells provided with protruding pieces of the honeycomb structure according to a third embodiment.

Although the honeycomb structure 1 is configured with a large number of cells 3 each of which is a hexagonal cell in the first and second embodiments described above, the shape of the cell 3 is arbitrary and may be appropriately changed. For example, as shown in FIG. 10, the honeycomb structure 1 may include a large number of cells 3 each of which is a quadrangular cell, and the protruding pieces 4 may be symmetrically arranged such that four adjacent cells 3 provided with a shared center vertex are each provided with the protruding piece 4. The cells 3 which have no protruding pieces 4 may be arranged to surround the four adjacent cells 3, for example. Alternatively, as was described in the second embodiment, a plurality of protruding pieces 4 may be arranged on one cell 3, or a configuration in which the protruding pieces 4 are arranged on the cells 3 which surround the four center cells 3 may also be adopted.

The honeycomb structure 1 having the abovementioned structure is made of a ceramic material and can be manufactured by using the following method. The ceramic raw materials are not particularly limited, and, for example, a plurality of ceramic raw material, silicon carbide, mullite, alumina, spinel, aluminum titanate, for example which form cordierite, are used. In particular, the ceramic material is preferably cordierite, and the plurality of ceramic raw materials that form cordierite are preferably used. The plurality of ceramic raw materials that form cordierite are raw materials types that form cordierite by reaction of the ceramic raw materials during a sintering process. That is, materials such as talc, kaolin, calcined kaolin, alumina, aluminum hydroxide, silica, and magnesium hydroxide, and are obtained by mixing ceramic raw materials including magnesia, alumina, and silica at a ratio that results in a known cordierite composition.

A clay is prepared by kneading the abovementioned ceramic raw materials, for example, with a molding compound that is a mixture of a binder, a surfactant, water, and the like. The binder is, for example, methyl cellulose, hydroxypropyl methylcellulose, hydroxyethyl cellulose, carboxymethyl cellulose, or the like, and, in particular, is preferably methyl cellulose or hydroxypropyl methylcellulose. A plurality of different kinds of binders may be used in combination. The percentage of binder content is preferably 3 to 15 mass weight parts with respect to 100 mass weight parts of the ceramic raw material. A fatty acid ester and a fatty acid soap, are examples of surfactants which may be employed, and a percentage of surfactant content is preferably 1 to 5 mass weight parts with respect to 100 mass weight parts of the ceramic raw material. The percentage of water content is preferably 23 to 32 mass weight parts, with respect to 100 parts by mass of the ceramic raw material. The kneading method is not particularly limited, but a kneader, a vacuum screw kneading machine, or the like can be used.

The obtained resultant clay is molded into a honeycomb shape, to form a molded body. For molding, a mold having a structure provided with a desired cell shape, a cell wall thickness, a cell density, and cell pitch is used, and the clay prepared as described above is extruded into the mold. An example of a method of forming the protruding piece 4 in the honeycomb molded body includes a method of forming the protruding piece 4 by controlling the flow of the clay during molding, and a method of processing the resultant molded body using a device having a needle-like processing blade or the like. From the perspective of productivity, the method of controlling the flow of the clay is preferable, specific examples thereof include a method of providing a board or net for controlling the amount of the clay to be supplied to the clay supply side of the mold, or providing a structure having a protruding shape or a structure for controlling the flow on the clay at a clay discharge side of the mold.

Next, the honeycomb molded body is dried and then sintered, for example, at 1400° C., and thus by formation of cordierite, a honeycomb structure referred to as the honeycomb structure 1 is obtained. Furthermore, when the honeycomb structure 1 is used as a catalyst carrier, the honeycomb structure 1 is immersed in a catalyst solution containing a noble metal catalyst, for example, and heat treatment performed. Thus, a catalyst body including a catalyst layer can be obtained.

EXAMPLES

Examples 1-6 and Comparative Examples 1-6

Using the aforementioned method, the honeycomb structure 1 made of cordierite is manufactured, the catalyst layer made of a noble metal is formed, and thus the catalyst body is obtained.

First, a cordierite raw material is obtained by mixing ceramic raw materials such as talc, kaolin, alumina, and aluminum hydroxide at a ratio to form a cordierite composition. With this raw forming cordierite, a binder such as methyl cellulose, a surfactant such as fatty acid ester, and water are mixed in the abovementioned range and kneaded into a clay, and then extruded into a molded body having a honeycomb structure. A honeycomb molded body in which a respective density, length L, height H, and distance D of the protruding piece 4 to be formed is changed is obtained by adjusting the flow of the clay during extrusion molding. The honeycomb molded body is dried and then sintered at 1400° C., thus forming the honeycomb structure 1. Note that the distance D1 from the end surface 12 of the honeycomb structure 1 to the protruding piece 4 and the distance Dt between the protruding pieces 4 are each set to the distance D (that is, D=D1=Dt).

The honeycomb structure 1 has a diameter φ of 100 mm and the length L of 100 mm, for example. As shown in Table 1, the honeycomb structures 1 according to examples 1 to 6 are obtained by changing the wall thickness of the cell 3 in the range of 50 and 150 μm (that is, 2 to 6 mil) and the cell density in the range of 400 to 1200 cps (that is, 62 to 186 pieces/cm²). As shown in Table 2, examples 1-1 to 1-7 are obtained by changing the density per unit area of the protruding pieces 4 in a range of 0.2 to 50 pieces/cm²) for the honeycomb structure 1 according to Example 1.

TABLE 1

| Examples Comparative examples | Cell structure | | | Catalyst layer Thickness | Protrusion condition | | | | Note |
|---|---|---|---|---|---|---|---|---|---|
| | Shape | Wall thickness | | Cell density | | Density | Length L mm | Height H μm | Distance D mm | |
| | — | mil | μm | cps | μm | pieces/cm2 | | | | |
| 1 | Hexagon | 3.5 | 88 | 600 | 50 | — | 0.45 | 200 | 4 | Density of 0 to 50 pieces/cm² |
| 2 | Hexagon | 2 | 50 | 600 | 50 | — | 0.45 | 200 | 4 | Density of 0 to 50 pieces/cm² |
| 3 | Hexagon | 6 | 150 | 400 | 70 | — | 0.45 | 200 | 4 | Density of 0 to 50 pieces/cm² |
| 4 | Hexagon | 3.5 | 88 | 1200 | 40 | — | 0.45 | 200 | 4 | Density of 0 to 50 pieces/cm² |
| 5 | Hexagon | 3.5 | 88 | 400 | 60 | — | 0.45 | 200 | 4 | Density of 0 to 50 pieces/cm² |
| 6 | Hexagon | 2 | 50 | 1200 | 40 | — | 0.45 | 200 | 4 | Density of 0 to 50 pieces/cm² |
| 7 | Hexagon | 3.5 | 88 | 600 | 50 | 2 | 0.45 | — | 4 | Height of 0 to 600 μm |
| 8 | Hexagon | 2 | 50 | 600 | 50 | 2 | 0.45 | — | 4 | Height of 0 to 600 μm |
| 9 | Hexagon | 6 | 150 | 400 | 70 | 2 | 0.45 | — | 4 | Height of 0 to 700 μm |
| 10 | Hexagon | 3.5 | 88 | 1200 | 40 | 2 | 0.45 | — | 4 | Height of 0 to 400 μm |
| 11 | Hexagon | 3.5 | 88 | 400 | 60 | 2 | 0.45 | — | 4 | Height of 0 to 700 μm |
| 12 | Hexagon | 2 | 50 | 1200 | 40 | 2 | 0.45 | — | 4 | Height of 0 to 400 μm |
| 13 | Hexagon | 3.5 | 88 | 600 | 50 | 2 | 0.45 | 200 | — | Distance of 1 to 50 mm |
| 14 | Hexagon | 2 | 50 | 600 | 50 | 2 | 0.45 | 200 | — | Distance of 1 to 20 mm |
| 15 | Hexagon | 6 | 150 | 400 | 70 | 2 | 0.45 | 200 | — | Distance of 1 to 20 mm |
| 16 | Hexagon | 3.5 | 88 | 1200 | 40 | 2 | 0.45 | 200 | — | Distance of 1 to 20 mm |
| 17 | Hexagon | 3.5 | 88 | 400 | 60 | 2 | 0.45 | 200 | — | Distance of 1 to 20 mm |
| 18 | Hexagon | 2 | 50 | 1200 | 40 | 2 | 0.45 | 200 | — | Distance of 1 to 20 mm |
| 19 | Hexagon | 3.5 | 88 | 600 | 50 | 2 | — | 200 | 4 | Length of 0.1 to 3.0 mm |
| 20 | Hexagon | 3.5 | 88 | 600 | 50 | 2 | — | 400 | 4 | Length of 0.1 to 3.0 mm |
| 21 | Hexagon | 3.5 | 88 | 600 | 50 | 2 | — | 200 | 20 | Length of 0.1 to 15 mm |

TABLE 2

| Examples Comparative examples | Density (pieces/cm2) | Purification performance (—) | Pressure loss (—) | Isostatic strength (MPa) |
|---|---|---|---|---|
| Comparative example 1 | 0 | 1.00 | 1.00 | 4.3 |
| Example 1-1 | 0.2 | 1.02 | 1.00 | 4.2 |
| Example 1-2 | 1.0 | 1.05 | 1.00 | 4.3 |
| Example 1-3 | 2.0 | 1.10 | 1.00 | 4.1 |
| Example 1-4 | 10.0 | 1.25 | 1.00 | 4.3 |
| Example 1-5 | 20.0 | 1.30 | 1.00 | 4.2 |
| Example 1-6 | 40.0 | 1.33 | 1.01 | 4.0 |
| Example 1-7 | 50.0 | 1.36 | 1.03 | 1.6 |
| Comparative example 2 | 0 | 1.00 | 1.00 | 3.0 |
| Example 2-1 | 1.0 | 1.07 | 1.00 | 3.1 |
| Example 2-2 | 2.0 | 1.14 | 1.00 | 2.9 |
| Example 2-3 | 20.0 | 1.34 | 1.00 | 2.8 |
| Example 2-4 | 40.0 | 1.40 | 1.02 | 2.8 |
| Example 2-5 | 50.0 | 1.44 | 1.03 | 0.6 |
| Comparative example 3 | 0 | 1.00 | 1.00 | 12.0 |
| Example 3-1 | 1.0 | 1.04 | 1.00 | 12.2 |
| Example 3-2 | 2.0 | 1.09 | 1.00 | 12.0 |
| Example 3-3 | 20.0 | 1.25 | 1.00 | 11.8 |
| Example 3-4 | 40.0 | 1.28 | 1.02 | 12.0 |
| Example 3-5 | 50.0 | 1.32 | 1.04 | 10.0 |
| Comparative example 5 | 0 | 1.00 | 1.00 | 6.8 |
| Example 4-1 | 1.0 | 1.05 | 1.00 | 7.0 |
| Example 4-2 | 2.0 | 1.10 | 1.00 | 6.9 |
| Example 4-3 | 20.0 | 1.32 | 1.00 | 6.7 |
| Example 4-4 | 40.0 | 1.37 | 1.02 | 6.8 |
| Example 4-5 | 50.0 | 1.40 | 1.05 | 1.8 |

TABLE 2-continued

| Examples Comparative examples | Density (pieces/cm2) | Purification performance (—) | Pressure loss (—) | Isostatic strength (MPa) |
|---|---|---|---|---|
| Comparative example 5 | 0 | 1.00 | 1.00 | 3.2 |
| Example 5-1 | 1.0 | 1.02 | 1.00 | 3.4 |
| Example 5-2 | 2.0 | 1.09 | 1.00 | 3.2 |
| Example 5-3 | 20.0 | 1.28 | 1.00 | 3.4 |
| Example 5-4 | 40.0 | 1.30 | 1.02 | 3.1 |
| Example 5-5 | 50.0 | 1.32 | 1.05 | 1.2 |
| Comparative example 6 | 0 | 1.00 | 1.00 | 4.6 |
| Example 6-1 | 1.0 | 1.08 | 1.00 | 5.0 |
| Example 6-2 | 2.0 | 1.18 | 1.00 | 4.7 |
| Example 6-3 | 20.0 | 1.40 | 1.00 | 4.7 |
| Example 6-4 | 40.0 | 1.42 | 1.02 | 4.6 |
| Example 6-5 | 50.0 | 1.46 | 1.05 | 1.8 |

Figure 11:
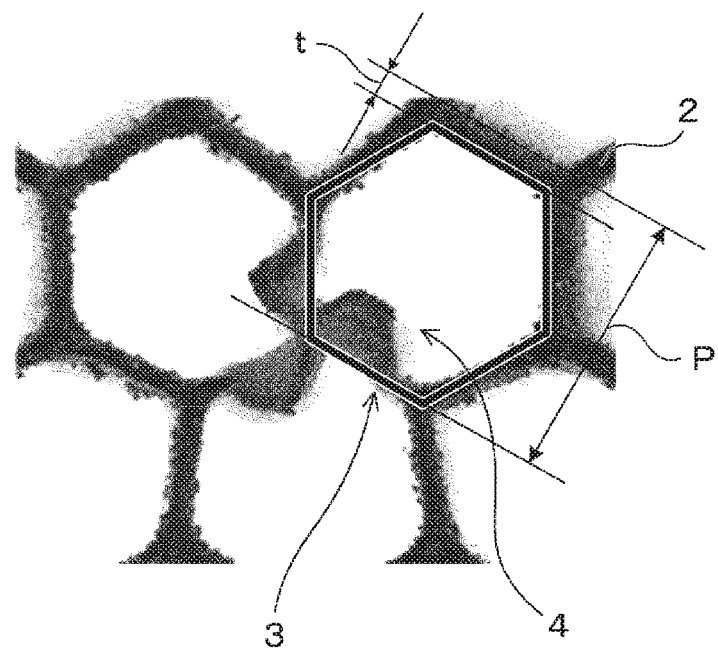
FIG. 11 shows an optical electron microscope observation image (i.e., 100-fold magnification) showing a cell structure including the protruding piece of the honeycomb structure according to an example.

As shown in the structures according to example 1-4 shown in FIG. 11 as an example, the cells 3 in the honeycomb structures 1 each have a hexagonal cross-section. The cell pitch P is 1100 μm, and each protruding piece 4 has the same length L of 0.45 mm, height H of 200 μm, and distance D of 4 mm. As shown in the drawings, it is confirmed that the protruding piece 4 is formed on each of the cell walls 2 leading to the shared vertex in the three adjacent cells 3.

In each of the honeycomb structures 1 according to Examples 1-1 to 1-7, a catalyst layer is formed, and thus a catalyst body is obtained. Furthermore, as Comparative example 1, in the honeycomb structure 1 having no protruding pieces 4 (that is, the density=0 pieces/cm²), a catalyst layer is formed likewise, and thus a catalyst body is obtained. Note that these catalyst bodies have the same amount of catalyst coating, i.e. the thickness tc of the catalyst layer indicated in Table 1 varies in a range of 40 to 70 μm according to an increase or decrease in the surface area depending on the wall thickness, cell density, for example, in the honeycomb structure 1.

Purification performance tests using a model gas was conducted on the catalyst bodies obtained in the example 1 and comparative example 1 to examine an impact on a purification performance, a pressure loss, and isostatic strength. In the honeycomb structure 1 according to the example 1, the wall thickness of the cell 3 was 88 μm (that is, 3.5 mil), and the cell density was 600 cps (that is, 93 pieces/cm²). The purification performance and the pressure loss was evaluated using relative values assuming that the result in the comparative example 1 is 1. The isostatic strength is expressed by a pressure value (unit: MPa) obtained at the time when the honeycomb structure 1 was broken in an isostatic strength test according the method defined by JASO M 505-87.

Figure 12:
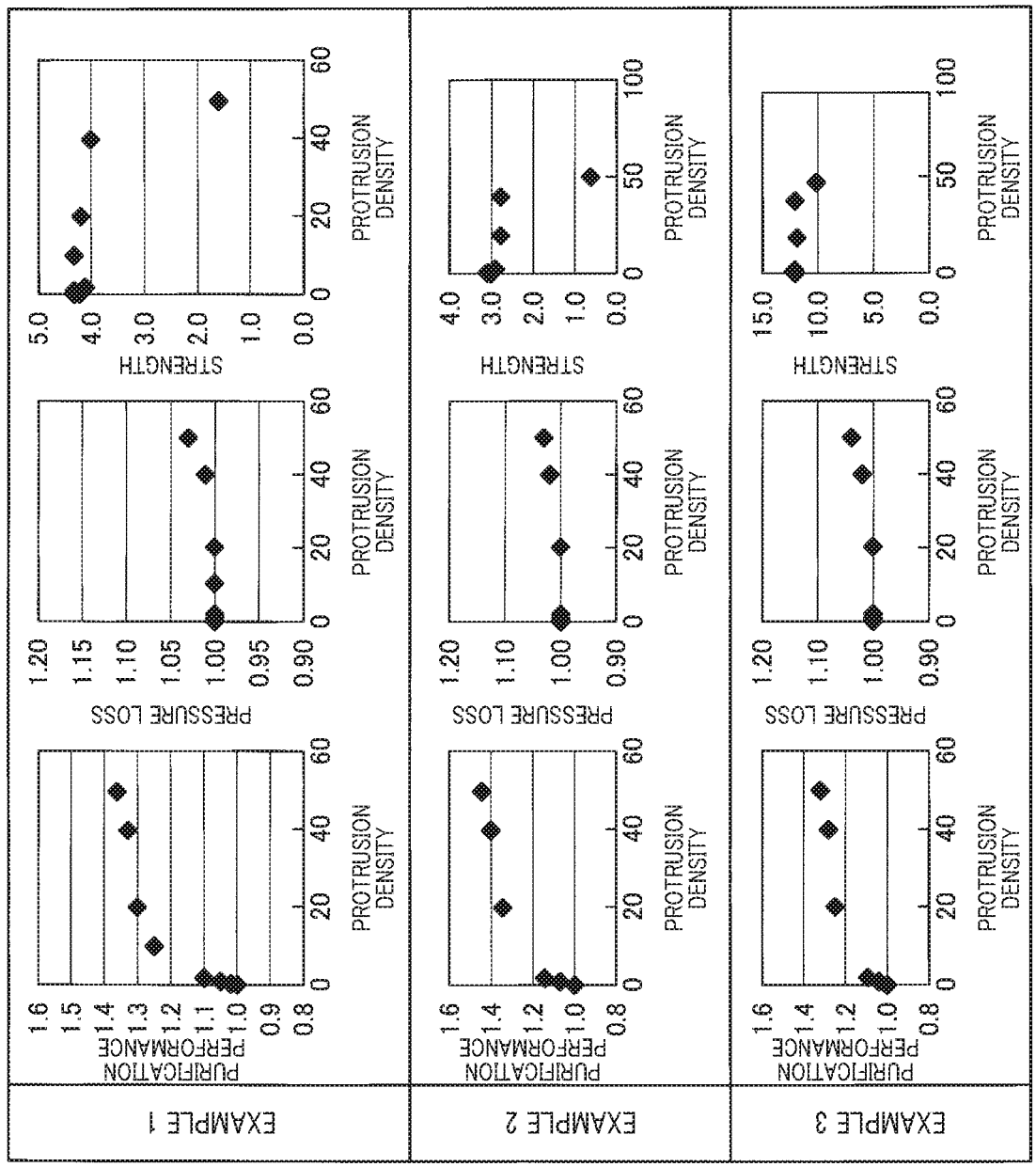
FIG. 12 shows a relationship between a density of the protruding piece and a purification performance, a pressure loss, and an isostatic strength of the honeycomb structures according to examples 1 to 3.

As is clear from the result in Table 2, when the protruding pieces 4 were formed shown in Examples 1-1 to 1-7, the purification performance improved, compared to the comparative example 1. At this time, as shown in FIG. 12, a performance improvement effect was obtained even when the density of the protruding pieces 4 (that is, the protrusion density in the drawings) was relatively small, and the pressure loss and the isostatic strength (which may be hereinafter referred to as strength) was not deteriorated.

As the density of the protruding pieces 4 increases, the purification performance improved without deterioration the pressure loss and the strength, however, when the density of the protruding pieces 4 is increased further, the pressure loss increases, and the strength decreases.

Also in examples 2-1 to 2-5 and comparative example 2 in which the wall in the honeycomb structure 1 is thin (that is, a wall thickness of 50 μm), the same or similar tendency was observed. This is the case also in examples 3-1 to 3-5 and comparative example 3 in which the wall in the honeycomb structure 1 is thick and the cell density is small (that is, a wall thickness of 150 μm and cell density of 400 cps which is 62 pieces/cm²). According to these results, when the density of the protruding pieces 4 was greater than or equal to 1.0 piece/cm², for example, the purification performance improved by 5% or more, and when the density of the protruding pieces 4 was greater than or equal to 2.0 pieces/cm², for example, the purification performance improved by 10% or more. Preferably, when the density of the protruding pieces 4 is set to less than or equal to 40 pieces/cm², an increase in the pressure loss and a decrease in the strength can be suppressed.

Figure 13:
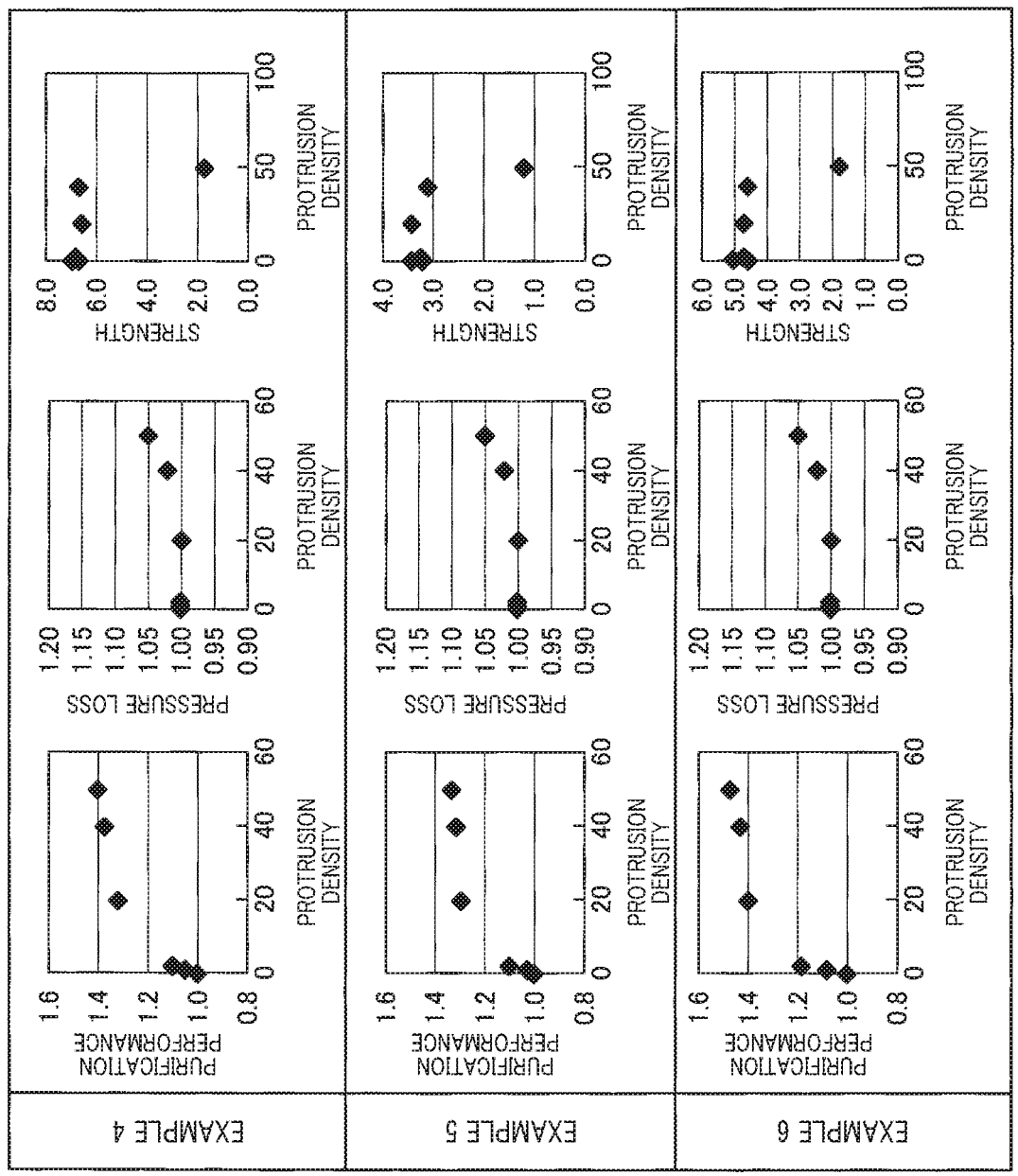
FIG. 13 shows a relationship between the density of a protruding piece and the purification performance, the pressure loss, and the isostatic strength of the honeycomb structures according to examples 4 to 6.

Furthermore, as shown in FIG. 13, also in examples 4-1 to 4-5 and comparative example 4 in each of which the honeycomb structure 1 was provided with an increased cell density (that is, 1200 cps which is 186 pieces/cm²), the same or similar tendency was observed. Note that the reason for further improved purification performance is considered to be a result of an increase in the cell density, and also due to the distance Dc to the cell center which became shorter than before the increase in the cell density. In addition, an increase in the pressure loss is also observed. This is the case also in examples 5-1 to 5-5 and comparative example 5 with decreased cell density (that is, 400 cps which is 62 pieces/cm²) and also in examples 6-1 to 6-5 and comparative example 6 with increased cell density and a decreased cell wall thickness (that is, a wall thickness of 50 μm and cell density of 400 cps which is 62 pieces/cm²).

Examples 7-12

By methods substantially the same as in Examples 1 to 6, the honeycomb structures 1 in which the height H of the protruding piece 4 varies in the range of 25 to 700 μm are manufactured as shown in Table 3. In each of the honeycomb structures 1, the density of the protruding pieces 4 is 2.0 pieces/cm². Similar to Examples 1 to 6, the wall thickness and the cell density was changed to obtain the honeycomb structures 1 according to Examples 7-1 to 7-8, Examples 8-1 to 8-5, Examples 9-1 to 9-5, Examples 10-1 to 10-4, Examples 11-1 to 11-4, and Examples 12-1 to 12-5. In this case, a catalyst layer is formed for each of the honeycomb structures 1, and thus a catalyst body was obtained. Table 3 shows results of examining the effects on the purification performance, the pressure loss, and the isostatic strength in like manner as above. Furthermore, the result of the honeycomb structures 1 according to Comparative examples 1 to 6 in which no protruding pieces 4 are formed (that is, the height H=0 μm) are also shown in Table 3.

TABLE 3

| Examples Comparative examples | Height (μm) | Purification performance (—) | Pressure loss (—) | Isostatic strength (MPa) |
|---|---|---|---|---|
| Comparative example 1 | 0 | 1.00 | 1.00 | 4.3 |
| Example 7-1 | 25 | 1.01 | 1.00 | 4.1 |
| Example 7-2 | 50 | 1.01 | 1.00 | 4.3 |
| Example 7-3 | 100 | 1.05 | 1.00 | 4.2 |
| Example 7-4 | 200 | 1.10 | 1.00 | 4.1 |

TABLE 3-continued

| Examples Comparative examples | Height (μm) | Purification performance (—) | Pressure loss (—) | Isostatic strength (MPa) |
|---|---|---|---|---|
| Example 7-5 | 400 | 1.24 | 1.00 | 4.2 |
| Example 7-6 | 500 | 1.30 | 1.02 | 4.2 |
| Example 7-7 | 550 | 1.34 | 1.04 | 4.0 |
| Example 7-8 | 600 | 1.38 | 1.09 | 4.2 |
| Comparative example 2 | 0 | 1.00 | 1.00 | 3.0 |
| Example 8-1 | 50 | 1.01 | 1.00 | 2.9 |
| Example 8-2 | 200 | 1.14 | 1.00 | 2.9 |
| Example 8-3 | 500 | 1.36 | 1.01 | 2.8 |
| Example 8-4 | 550 | 1.40 | 1.04 | 3.2 |
| Example 8-5 | 600 | 1.42 | 1.08 | 2.9 |
| Comparative example 3 | 0 | 1.00 | 1.00 | 12.0 |
| Example 9-1 | 70 | 1.01 | 1.00 | 11.8 |
| Example 9-2 | 100 | 1.04 | 1.00 | 12.1 |
| Example 9-3 | 200 | 1.09 | 1.00 | 12.0 |
| Example 9-4 | 600 | 1.20 | 1.04 | 11.9 |
| Example 9-5 | 700 | 1.25 | 1.10 | 12.2 |
| Comparative example 4 | 0 | 1.00 | 1.00 | 6.8 |
| Example 10-1 | 100 | 1.04 | 1.00 | 6.8 |
| Example 10-2 | 200 | 1.10 | 1.00 | 6.9 |
| Example 10-3 | 300 | 1.24 | 1.01 | 7.1 |
| Example 10-4 | 400 | 1.31 | 1.10 | 6.9 |
| Comparative example 5 | 0 | 1.00 | 1.00 | 3.2 |
| Example 11-1 | 100 | 1.04 | 1.00 | 3.0 |
| Example 11-2 | 200 | 1.09 | 1.00 | 3.2 |
| Example 11-3 | 600 | 1.21 | 1.04 | 3.0 |
| Example 11-4 | 700 | 1.24 | 1.12 | 3.1 |
| Comparative example 6 | 0 | 1.00 | 1.00 | 4.6 |
| Example 12-1 | 40 | 1.02 | 1.00 | 4.2 |
| Example 12-2 | 100 | 1.10 | 1.00 | 4.3 |
| Example 12-3 | 200 | 1.18 | 1.00 | 4.7 |
| Example 12-4 | 350 | 1.28 | 1.00 | 4.2 |
| Example 12-5 | 400 | 1.31 | 1.08 | 4.5 |

Figure 14:
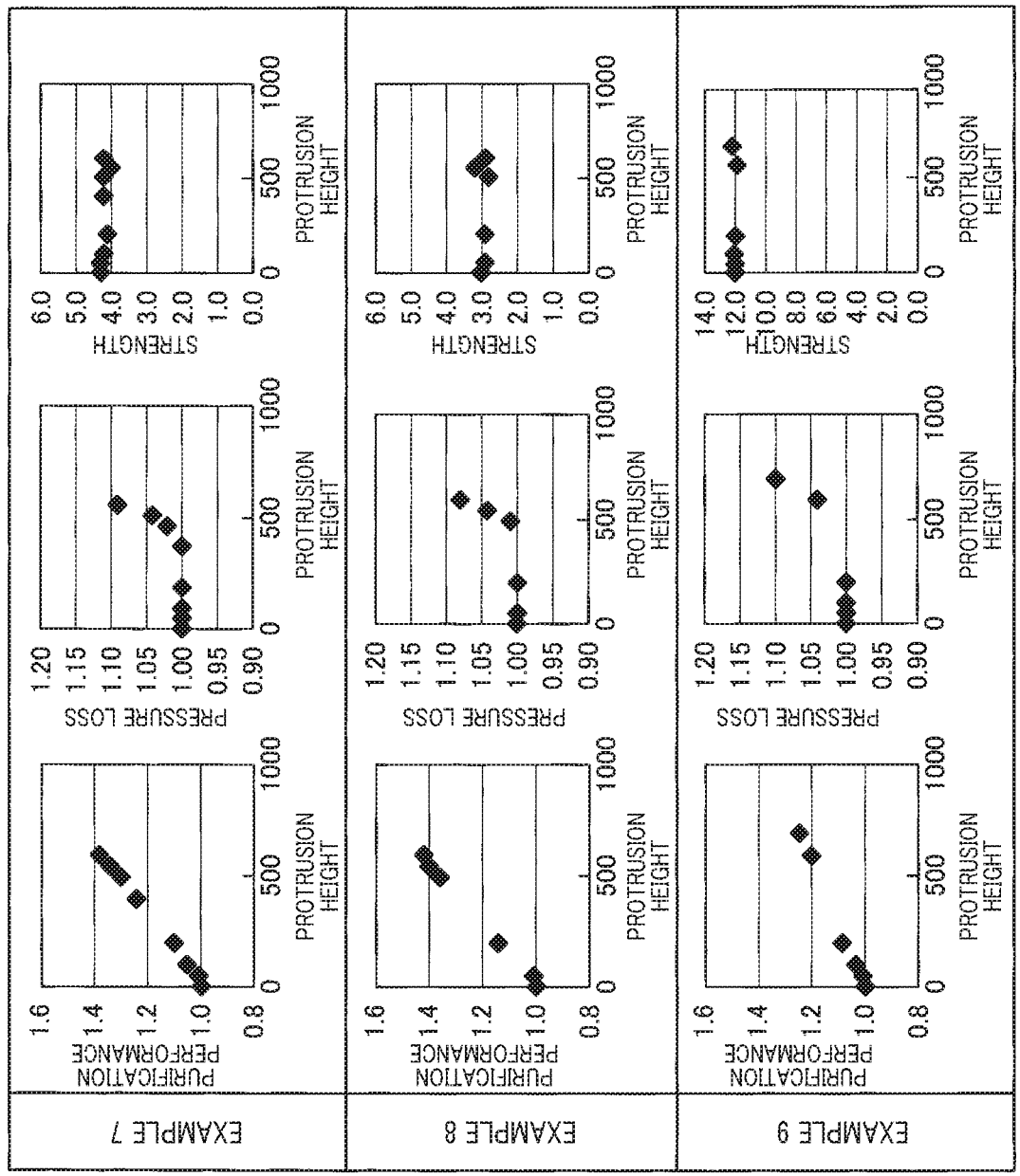
FIG. 14 shows a relationship between a height of a protruding piece and the purification performance, the pressure loss, and the isostatic strength of the honeycomb structures according to examples 7 to 9.

As is clear in Table 3, when the protruding pieces 4 are formed as in Examples 7-1 to 7-8, the purification performance improved compared to Comparative example 1. At this time, as shown in FIG. 14, as the height H of the protruding piece 4 (that is, the protrusion height in the drawings) increased, a further improved performance effect was obtained. Furthermore, when the height H exceeds the thickness tc of the catalyst layer, the effect was further improved. Furthermore, when the height H exceeds 500 μm, the pressure loss gradually progressed. This height H is substantially equivalent to the distance Dc to the cell center, which is calculated according to the equation below using the cell pitch P and the cell wall thickness t. When the height H satisfies a range of Dc≥H≥Dc/2, there is almost no increase in the pressure loss and almost no decrease in the strength.

$Dc=(P-t)/2=(1.1\text{ mm}-0.088\text{ mm})/2=0.51\text{ mm}$

Also in Examples 8-1 to 8-5 in which the wall in the honeycomb structure 1 is thin (that is, a wall thickness of 50 μm), the same or similar tendency was observed for the distance Dc below.

$Dc=(P-t)/2=(1.1\text{ mm}-0.05\text{ mm})/2=0.53\text{ mm}$

Also in Examples 9-1 to 9-5 in which the wall in the honeycomb structure 1 was thick (that is, a wall thickness of 150 μm), the same or similar tendency was observed for the distance Dc below.

$Dc=(P-t)/2=(1.36\text{ mm}-0.15\text{ mm})/2=0.61\text{ mm}$

Furthermore, also in Examples 10 to 12 in which the cell pitch P increases or decreases by changing the cell density, the same or similar tendency was observed for the distance Dc below.

Figure 15:
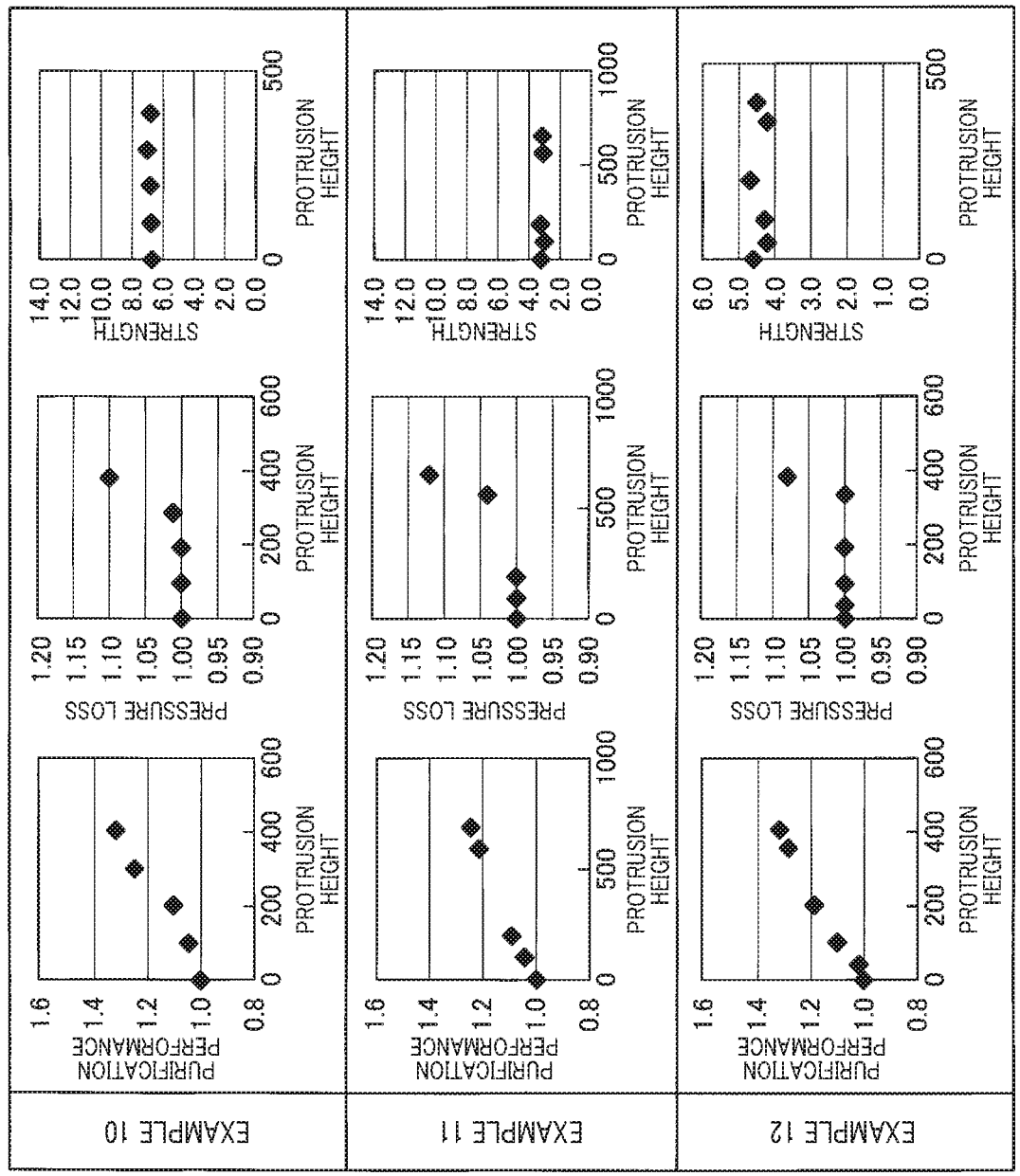
FIG. 15 shows a relationship between the height of the protruding piece and the purification performance, pressure loss, and isostatic strength of honeycomb structures according to Examples 10 to 12.

Example 10: Dc=(0.79 mm−0.088 mm)/2=0.35 mm
Example 11: Dc=(1.36 mm−0.088 mm)/2=0.64 mm
Example 12: Dc=(0.79 mm−0.05 mm)/2=0.37 mm As shown in FIGS. 14 and 15, according to these results, the height H of the protruding piece 4 is greater than or equal to the thickness tc of the catalyst layer, preferably at least half of the distance Dc, and is preferably set to less than or equal to the distance Dc.

Examples 13-18

By methods substantially the same as in Examples 1 to 6, the honeycomb structures 1 in which the distance D between the protruding pieces 4 varied in the range of 1 to 20 μm was manufactured as shown in Table 4. In each of the honeycomb structures 1, the height of the protruding piece 4 is set to 200 μm, and the density of the protruding pieces 4 was set to 1.0 to 2.0 pieces/cm². Similar to Examples 1 to 6, as a result of changing the wall thickness and the cell density, the honeycomb structures 1 were obtained according to the respective Examples 13-1 to 13-5, Examples 14-1 to 14-5, Examples 15-1 to 15-5, Examples 16-1 to 16-5, Examples 17-1 to 17-5, and Examples 18-1 to 18-5. A catalyst layer was formed on each of the honeycomb structures 1, and thus a catalyst body was obtained. Table 4 shows the result of examining the impact on the purification performance, the pressure loss, and the strength in like manner as above.

TABLE 4

| Examples | Distance D (mm) | Purification performance (—) | Pressure loss (—) | Isostatic strength (MPa) |
|---|---|---|---|---|
| Example 13-1 | 1 | 1.38 | 1.05 | 3.0 |
| Example 13-2 | 2 | 1.20 | 1.00 | 4.2 |
| Example 13-3 | 4 | 1.10 | 1.00 | 4.1 |
| Example 13-4 | 10 | 1.06 | 1.00 | 4.3 |
| Example 13-5 | 20 | 1.02 | 1.00 | 4.0 |
| Example 14-1 | 1 | 1.40 | 1.06 | 1.5 |
| Example 14-2 | 2 | 1.22 | 1.01 | 3.0 |
| Example 14-3 | 4 | 1.14 | 1.00 | 2.9 |
| Example 14-4 | 10 | 1.08 | 1.00 | 2.8 |
| Example 14-5 | 20 | 1.03 | 1.00 | 3.2 |
| Example 15-1 | 1 | 1.20 | 1.06 | 4.0 |
| Example 15-2 | 2 | 1.12 | 1.00 | 12.5 |
| Example 15-3 | 4 | 1.09 | 1.00 | 12.0 |
| Example 15-4 | 10 | 1.05 | 1.00 | 11.8 |
| Example 15-5 | 20 | 1.01 | 1.00 | 12.1 |
| Example 16-1 | 1 | 1.22 | 1.10 | 2.9 |
| Example 16-2 | 2 | 1.18 | 1.01 | 7.1 |
| Example 16-3 | 4 | 1.10 | 1.00 | 6.9 |
| Example 16-4 | 10 | 1.06 | 1.00 | 6.6 |
| Example 16-5 | 20 | 1.02 | 1.00 | 6.8 |
| Example 17-1 | 1 | 1.22 | 1.05 | 0.4 |
| Example 17-2 | 2 | 1.16 | 1.00 | 2.8 |
| Example 17-3 | 4 | 1.09 | 1.00 | 3.2 |
| Example 17-4 | 10 | 1.04 | 1.00 | 2.9 |
| Example 17-5 | 20 | 1.02 | 1.00 | 3.1 |
| Example 18-1 | 1 | 1.30 | 1.09 | 0.8 |
| Example 18-2 | 2 | 1.24 | 1.00 | 4.5 |
| Example 18-3 | 4 | 1.18 | 1.00 | 4.7 |
| Example 18-4 | 10 | 1.10 | 1.00 | 4.2 |
| Example 18-5 | 20 | 1.06 | 1.00 | 4.6 |

Figure 16:
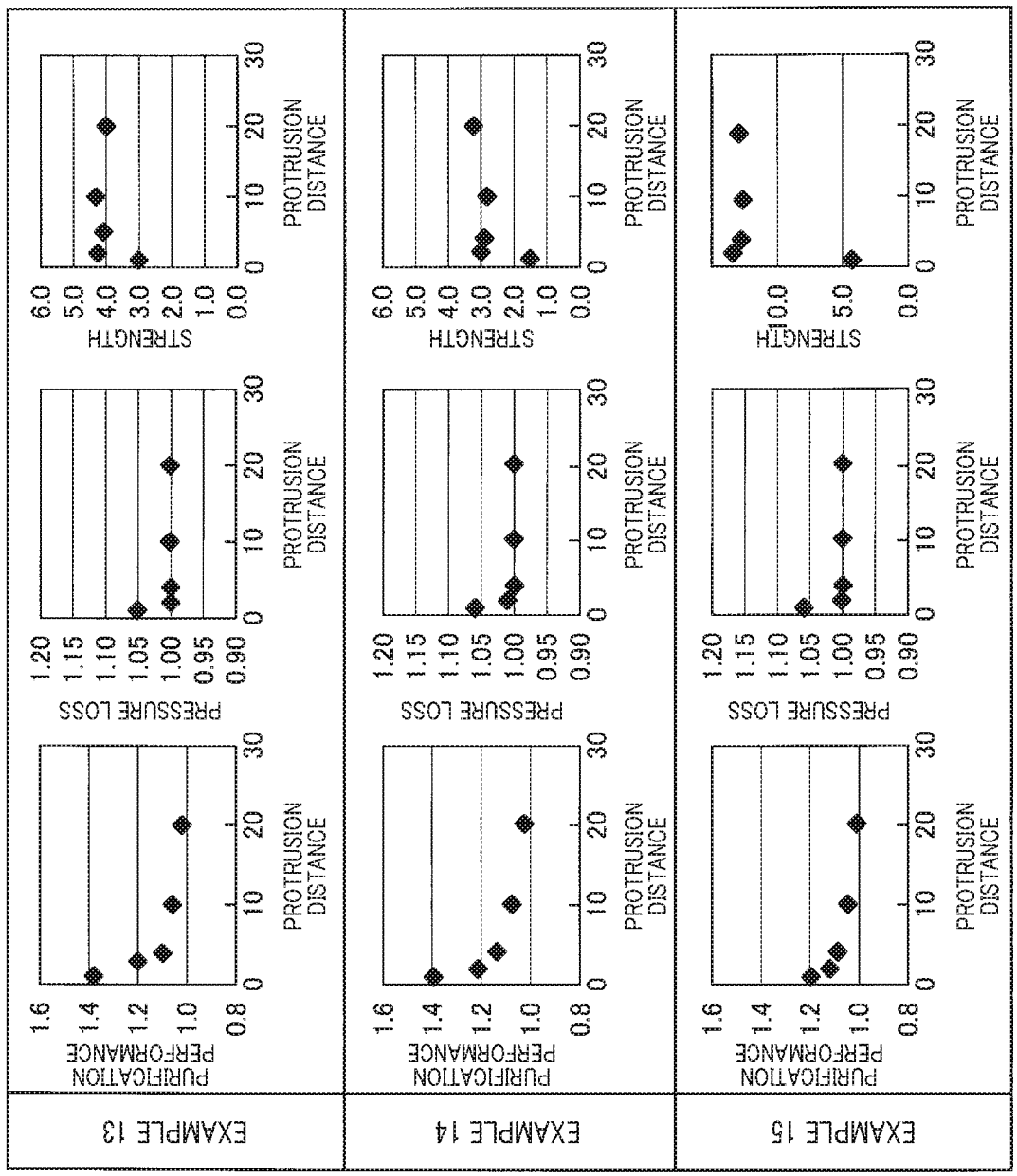
FIG. 16 shows a relationship between a distance between protruding pieces and the purification performance, pressure loss, and isostatic strength of the honeycomb structures according to Examples 13 to 15.

As is clear from Table 4, in Examples 13-1 to 13-5, the purification performance varies according to the distance D between the protruding pieces 4. At this time, as shown in FIG. 16, as the distance D between the protruding pieces 4

(that is, the protrusion distance shown in the drawings) decreases, the number of protruding pieces 4 arranged in the axial direction inside one cell 3 increases, and thus the purification performance improves. Note that when the distance D is very small (that is, D=1 mm) relative to the length L of the protruding piece 4 (that is, L=0.45 mm), as shown in Example 13-1, the purification performance is high, however an increase in the pressure loss and a decrease in the strength are observed. Furthermore, as the distance D approaches 20 mm, the effect of improving the purification performance is reduced.

Figure 17:
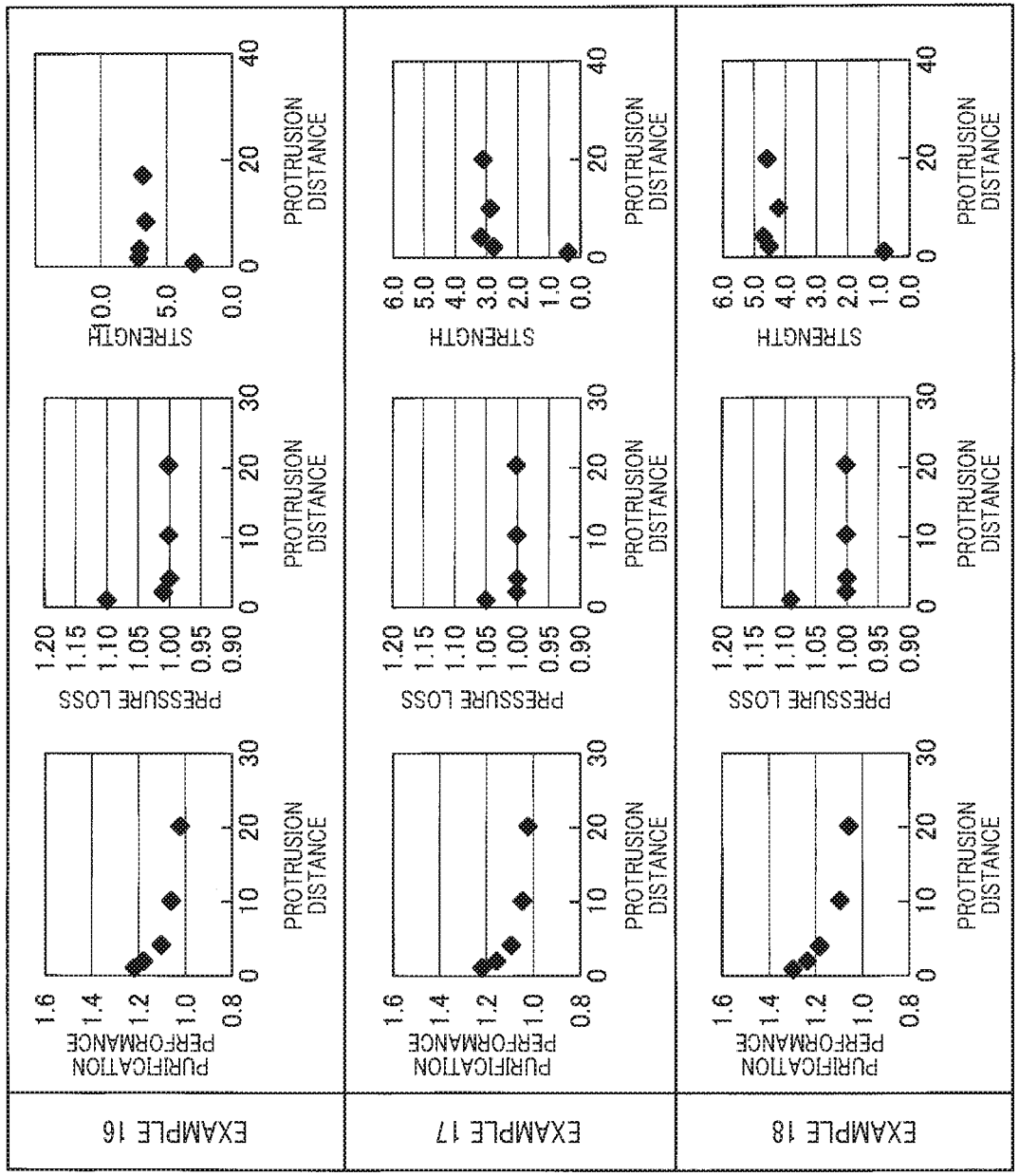
FIG. 17 shows a relationship between the distance between protruding pieces and the purification performance, pressure loss, and isostatic strength of the honeycomb structures according to Examples 16 to 18.

This tendency is observed also in Examples 14-1 to 14-5 in which the wall in the honeycomb structure 1 is thin (that is, a wall thickness of 50 nm) and in Examples 15-1 to 15-5 in which the wall in the honeycomb structure 1 is thick (that is, a wall thickness of 150 nm). Furthermore, as shown in FIG. 17, this is also the case also for Examples 16 to 18, were the cell density was different. According to these results, it is preferred that the distance D of the protruding piece 4 is set to be at least twice as long as the length L, and preferably set in the range of 2 to 20 mm.

Examples 19-21

By methods substantially the same as in Example 1, the honeycomb structures 1 having a varying length L in relation to the height H of the protruding piece 4 are manufactured as shown in Table 5. In each of the honeycomb structures 1, the wall thickness is 88 μm and the cell density is 600 cps, and the density of the protruding pieces 4 is set to 2.0 pieces/cm² and the height of the protruding piece 4 is set to 200 to 400 μm. Similar to Example 1, the honeycomb structures 1 according to Examples 19-1 to 19-7, examples 20-1 to 20-7, and examples 21-1 to 21-7 are obtained by changing the length L of the protruding piece 4 in the range of 0.1 to 15.0 mm. In each of the honeycomb structures 1, a catalyst layer is formed, and thus a catalyst body is obtained. Table 5 shows the result of examining the effects on the purification performance, the pressure loss, and the strength in like manner as above.

TABLE 5

| Examples | Length L (mm) | Purification performance (—) | Pressure loss (—) | Isostatic strength (MPa) |
|---|---|---|---|---|
| Example 19-1 | 0.10 | 1.02 | 1.02 | 4.1 |
| Example 19-2 | 0.20 | 1.09 | 1.00 | 4.2 |
| Example 19-3 | 0.30 | 1.10 | 1.00 | 4.0 |
| Example 19-4 | 0.45 | 1.10 | 1.00 | 4.1 |
| Example 19-5 | 1.0 | 1.11 | 1.00 | 4.0 |
| Example 19-6 | 2.0 | 1.14 | 1.00 | 4.2 |
| Example 19-7 | 3.0 | 1.18 | 1.00 | 2.1 |
| Example 20-1 | 0.10 | 1.09 | 1.10 | 4.2 |
| Example 20-2 | 0.20 | 1.11 | 1.05 | 4.5 |
| Example 20-3 | 0.30 | 1.18 | 1.03 | 4.4 |
| Example 20-4 | 0.45 | 1.24 | 1.00 | 4.2 |
| Example 20-5 | 1.0 | 1.26 | 1.00 | 4.1 |
| Example 20-6 | 2.0 | 1.30 | 1.00 | 4.0 |
| Example 20-7 | 3.0 | 1.32 | 1.00 | 1.8 |
| Example 21-1 | 0.10 | 1.00 | 1.04 | 4.1 |
| Example 21-2 | 0.30 | 1.02 | 1.00 | 4.2 |
| Example 21-3 | 0.45 | 1.02 | 1.00 | 4.0 |
| Example 21-4 | 1.0 | 1.03 | 1.00 | 3.9 |
| Example 21-5 | 3.0 | 1.06 | 1.00 | 4.2 |
| Example 21-6 | 10.0 | 1.10 | 1.00 | 4.0 |
| Example 21-7 | 15.0 | 1.15 | 1.00 | 1.2 |

Figure 18:
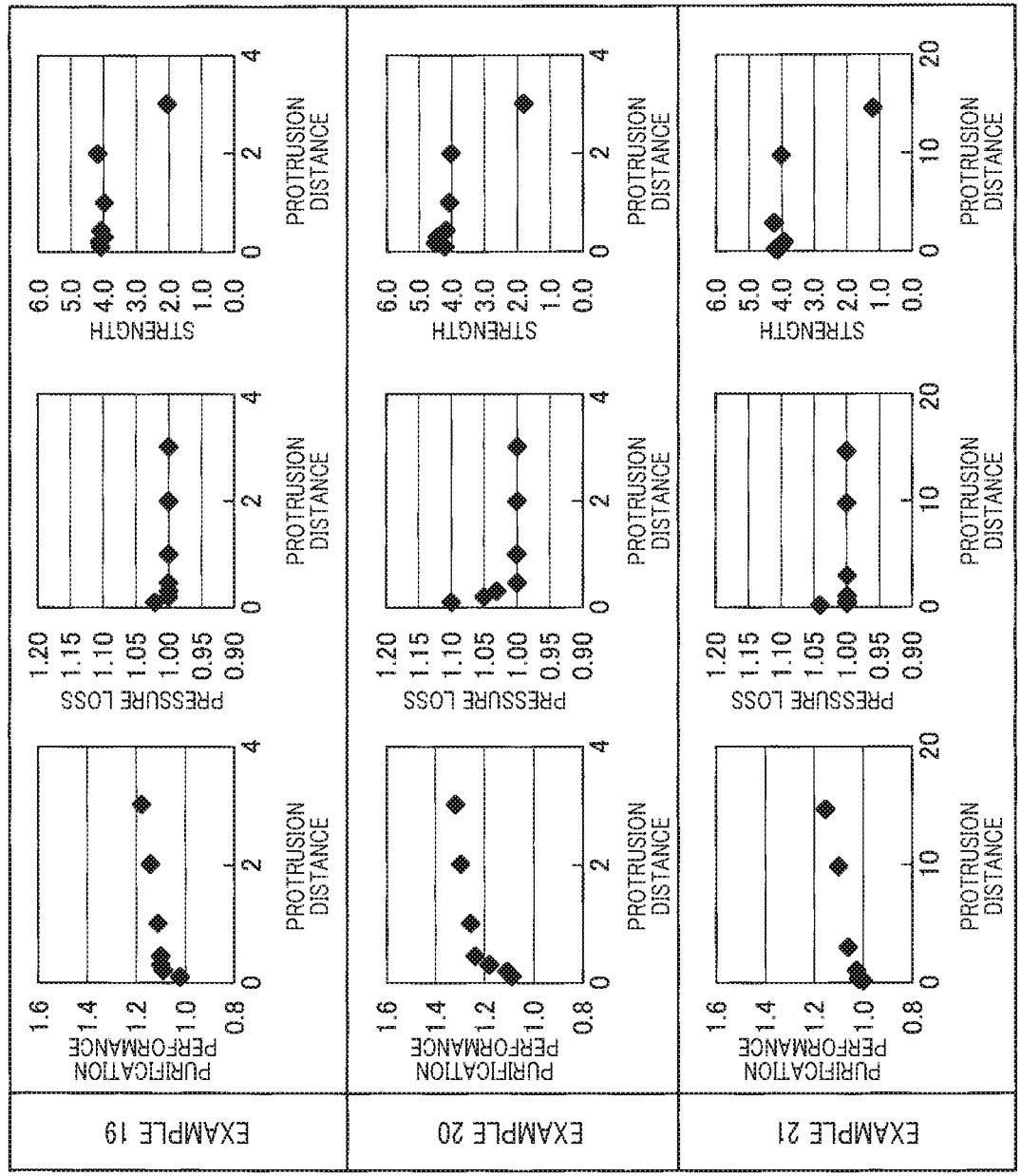
FIG. 18 shows a relationship between the distance between protruding pieces and the purification performance, pressure loss, and isostatic strength in honeycomb structures according to examples 19 to 21.

As is clear from Table 5, in Examples 19-1 to 19-7, the purification performance improved further as the length L of the protruding piece 4 increases. At this time, as shown in FIG. 18, when the length L was short (that is, L=0.1 mm) in relation to the height H of the protruding piece 4 (that is, H=200 μm=0.2 mm) as in Example 19-1, the pressure loss increased. Furthermore, when the length L was long (that is, L=3.0 mm) in relation to the distance D (that is, D=4 mm) as in Example 19-7, the strength decreased.

This tendency was also observed also in Example 20, that is, when the length L was short (that is, L=0.3 mm) in relation to the height H of the protruding piece 4 (that is, H=400 μm=0.4 mm) as in Example 20-1, the pressure loss increased. Furthermore, when the length L was long (that is, L=3.0 mm) in relation to the distance D (that is, D=4 mm) as in Example 20-7, the strength decreased. Also is shown in Example 21, when the length L was short (that is, L=0.1 mm) in relation to the height H of the protruding piece 4 (that is, H=200 μm=0.2 mm) as in Example 22-1, the pressure loss increased. Furthermore, when the length L was long (that is, L=15.0 mm) in relation to the distance D (that is, D=20 mm) as in Example 21-7, the strength decreased.

According to these results, the length L is preferably set to be greater than the height H of the protruding piece 4 1 and ½ of the distance D (that is, L≥H and L≥D/2).

The present disclosure is not limited to the content described in the abovementioned embodiments and the abovementioned examples, and various modifications are possible within the limits of the present invention. For example, the cell shape of the honeycomb structure 1 may be any shape including a circle and other polygons than a quadrangle and a hexagon. Two or more cell shapes and different-sized cell shapes may be combined. Furthermore, although the abovementioned embodiments describe examples the present invention which is applied to the exhaust purification catalyst for automobiles, the present invention can be arbitrarily used for various applications including not only automobile engines, but also catalysts that purify exhaust from various devices.

What is claimed is:
1. A honeycomb structure comprising:
cell walls which partition an inside of a cylindrical outer skin, the cell walls having openings at both ends; and
a large number of cells which are surrounded by the cell walls and arranged in parallel in an axial direction of the cylindrical outer skin, having a polygonal cross sectional shape, wherein at least a part of the large number of cells is provided with protruding pieces surrounding a vertex which is shared by adjacent cells, the protruding pieces are provided to surround the vertex of the polygonal shaped cell, and are symmetrically arranged in the adjacent cells, in an axial cross-section of the cell passing through the vertex,
each protruding piece forming:
a through-hole which penetrates through a corresponding one of the cell walls; and
a protruding wall which is obliquely raised at an inclination away from an edge of the through-hole and provided to protrude inward with respect to a corresponding one of the cell.
2. The honeycomb structure according to claim 1, wherein the protruding piece is a cut and raised piece on a corresponding one of the cell walls.
3. The honeycomb structure according to claim 1, wherein the protruding piece has a density which is equal to or higher than 1 piece/cm², per unit surface area, on a projection surface at an end surface in which the cell opens.

4. The honeycomb structure according to claim 1, wherein the protruding piece has a height H of a tip-end and a length L in the axial direction, which satisfies a relationship of L≥H.

5. The honeycomb structure according to claim 1, wherein the protruding piece has the height H of the tip-end, the cell has a center with a distance from the cell wall to the center of the cell given as a distance Dc, and the height H and the distance Dc satisfies a relationship of Dc≥H.

6. The honeycomb structure according to claim 1, wherein the protruding pieces are provided in plurality at intervals in the axial direction, on the cell wall.

7. The honeycomb structure according to claim 6, wherein between the protruding pieces a distance is given as a distance Dt, and the length L in the axial direction of the protruding piece and the distance Dt satisfies a relationship of Dt/2≥L.

8. A catalyst body formed by loading a catalyst on a honeycomb structure, the honeycomb structure comprising;
cell walls which partition an inside of a cylindrical outer skin having openings at both ends; and
a large number of cells which are surrounded by the cell walls and provided in parallel in an axial direction of the cylindrical outer skin having a polygonal cross sectional shape, wherein
at least a part of the large number of cells include protruding pieces surrounding a vertex which is shared by adjacent cells, the protruding pieces are provided to surround the vertex of the polygonal shaped cell, and are symmetrically arranged in the adjacent cells, in an axial cross-section of the cell passing through the vertex,
each protruding piece forming:
a through-hole which penetrates a corresponding one of the cell walls; and
a protruding wall which is obliquely raised at an inclination away from an edge of the through-hole and provided to protrude inward with respect to a corresponding one of the cells.

9. The honeycomb structure according to claim 2, wherein the protruding piece has a density which is equal to or higher than 1 piece/cm², per unit surface area, on a projection surface at an end surface in which the cell opens.

10. The honeycomb structure according to claim 1, wherein the protruding piece has a density which is equal to or higher than 1 piece/cm², per unit surface area, on a projection surface at an end surface in which the cell opens.

11. The honeycomb structure according to claim 2, wherein the protruding piece has a height H of a tip-end and a length L in the axial direction, which satisfies a relationship of L≥H.

12. The honeycomb structure according to claim 1, wherein the protruding piece has a height H of a tip-end and a length L in the axial direction, which satisfies a relationship of L≥H.

13. The honeycomb structure according to claim 3, wherein the protruding piece has a height H of a tip-end and a length L in the axial direction, which satisfies a relationship of L≥H.

14. The honeycomb structure according to claim 2, wherein the protruding piece has the height H of the tip-end, the cell has a center with a distance from the cell wall to the center of the cell given as a distance Dc, and the height H and the distance Dc satisfies a relationship of Dc≥H.

15. The honeycomb structure according to claim 1, wherein the protruding piece has the height H of the tip-end, the cell has a center with a distance from the cell wall to the center of the cell given as a distance Dc, and the height H and the distance Dc satisfies a relationship of Dc≥H.

16. The honeycomb structure according to claim 3, wherein the protruding piece has the height H of the tip-end, the cell has a center with a distance from the cell wall to the center of the cell given as a distance Dc, and the height H and the distance Dc satisfies a relationship of Dc≥H.

17. The honeycomb structure according to claim 2, wherein the protruding pieces are provided in plurality at predetermined intervals in the axial direction, on the cell wall.

18. The honeycomb structure according to claim 1, wherein the protruding pieces are provided in plurality at predetermined intervals in the axial direction, on the cell wall.

19. The honey comb structure according to claim 1, wherein three adjacent cells communicate with one another through the through-holes which are located in substantially same positions surrounding the shared vertex.

20. The catalyst body according to claim 8, wherein three adjacent cells communicate with one another through the through-holes which are located in substantially same positions surrounding the shared vertex.

* * * * *

UNITED STATES PATENT AND TRADEMARK OFFICE
CERTIFICATE OF CORRECTION

PATENT NO. : 10,883,400 B2  
APPLICATION NO. : 16/071498  
DATED : January 5, 2021  
INVENTOR(S) : Suzuki Page 1 of 1

It is certified that error appears in the above-identified patent and that said Letters Patent is hereby corrected as shown below:

On the Title Page

Item (22) reads:  
(22) PCT Filed: Jan. 18, 2016  
Should read:  
(22) PCT Filed: Oct. 18, 2016.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*